US012263504B2

(12) United States Patent
Suescun Sanz et al.

(10) Patent No.: US 12,263,504 B2
(45) Date of Patent: Apr. 1, 2025

(54) ADHESIVE APPLICATOR HEAD

(71) Applicant: FOCKE MELER GLUING SOLUTIONS, S.A., Arazuri (ES)

(72) Inventors: Francisco Javier Suescun Sanz, Orcoyen (ES); Jose Joaquín Zabalza Goni, Orcoyen (ES)

(73) Assignee: FOCKE MELER GLUING SOLUTIONS, S.A., Arazuri (ES)

( * ) Notice: Subject to any disclaimer, the term of this patent is extended or adjusted under 35 U.S.C. 154(b) by 226 days.

(21) Appl. No.: 17/995,553

(22) PCT Filed: Mar. 26, 2021

(86) PCT No.: PCT/ES2021/070210
§ 371 (c)(1),
(2) Date: Oct. 5, 2022

(87) PCT Pub. No.: WO2021/209658
PCT Pub. Date: Oct. 21, 2021

(65) Prior Publication Data

US 2023/0149970 A1 May 18, 2023

(30) Foreign Application Priority Data

Apr. 16, 2020 (ES) ................................ P202030308

(51) Int. Cl.
*B05C 5/00* (2006.01)
*B05C 5/02* (2006.01)

(52) U.S. Cl.
CPC ............ *B05C 5/0266* (2013.01); *B05C 5/001* (2013.01); *B05C 5/0204* (2013.01); *B05C 5/027* (2013.01)

(58) Field of Classification Search
CPC ....... B05C 5/0266; B05C 5/001; B05C 5/027; B05C 5/0204
See application file for complete search history.

(56) References Cited

U.S. PATENT DOCUMENTS 3,792,801 A * 2/1974 Baker .................. B29B 13/022
392/471
5,305,955 A 4/1994 Smitherman et al.
(Continued)

FOREIGN PATENT DOCUMENTS

JP H0584458 A 4/1993
WO 2006101630 A1 9/2006

OTHER PUBLICATIONS

International Search Report for Corresponding International Application No. PCT/ES2021/070210 dated May 20, 2021 and English Translation, 7 pages.

*Primary Examiner* — Frederick C Nicolas
(74) *Attorney, Agent, or Firm* — LUCAS & MERCANTI, LLP

(57) ABSTRACT

An adhesive applicator head, having a heated block (1) to which an adhesive feed (2) is connected; linked to the heated block (1) is a nozzle (4) determining an outlet for the laminar projection of the adhesive to be applied from the heated block (1), where the nozzle (4) has a body (6) and a cover (7) between which there is a space (8) leading to an adhesive outlet groove (9); with regard to the space (8), and externally, there being a plate (10) covering the groove (9), the plate (10) being displaceable between different attachment positions of the plate (10) to the nozzle (4) determining variable lengths of laminar adhesive outlet through the groove (9).

9 Claims, 5 Drawing Sheets

(56) References Cited

U.S. PATENT DOCUMENTS

| | | | | | |
|---|---|---|---|---|---|
| 5,728,219 | A * | 3/1998 | Allen | .................... B05C 5/0279 | |
| | | | | 425/464 | |
| 8,578,729 | B2 * | 11/2013 | Fiske | .................... B05C 5/0237 | |
| | | | | 62/389 | |
| 9,061,312 | B2 * | 6/2015 | Kitani | ....................... B05C 5/00 | |
| 2011/0223337 | A1 | 9/2011 | Yanagawa et al. | | |
| 2014/0102360 | A1 | 4/2014 | Kitani et al. | | |

* cited by examiner

ADHESIVE APPLICATOR HEAD

CROSS REFERENCE TO RELATED APPLICATION

This Application is a 371 of PCT/ES2021/070210, filed on Mar. 26, 2021 which claims the benefit of Spanish Patent Application No. P202030308, filed on Apr. 16, 2020, each of which are incorporated herein by reference.

TECHNICAL FIELD

The present invention relates to the automatic application of adhesives in laminar extensions which are deposited on the objects of application, proposing an applicator head for this function, with which advantageous features are achieved both in the constructive embodiment and for handling.

STATE OF THE ART

In certain applications that use adhesives to affix objects, such as, for example, bottle labelling or similar processes, automatic application heads are conventionally used where the laminar adhesive is extended on the areas that are to be affixed.

Said adhesive applicator heads comprise a heated block, in which an adhesive to be applied is received, in order to be supplied, generally through an injector module, to a lamination nozzle through which the adhesive exits in order to be deposited on the target sites.

For the function of laminar extension of the adhesive, the outlet nozzle consists of a body and a cover, between which there is a groove that makes up the adhesive outlet mouth; with regard to said outlet groove, there being a sheet that, with its configuration, determines the extension of the desired lamination outlet width.

Conventionally, the aforementioned sheet that determines the lamination outlet width in the nozzles of the applicator heads is attached to the body of the nozzle with screws, so that, in order to change the lamination outlet width, when so required in different applications, it is necessary to remove the cover from the nozzle, to disassemble the sheet and place the new one that corresponds, and then put the cover back on. This process, in applications that require repeated sheet changes, greatly slows down production processes, as well as increases the risk of leaks through the groove when the width changes. In addition, it may damage the sheets after removing them from the nozzle. In turn, this process is carried out with the machine at a high temperature, meaning that the operator could suffer burns.

To solve the problem, adhesive outlet nozzles have been developed which are provided with a limiting sheet for limiting the width of the lamination outlet in a longitudinally displaceable arrangement, so that it is not necessary to open the nozzle to change the sheet when the lamination outlet width is to be modified. However, the nozzles developed in this sense are based on embodiments that considerably increase the volume of the structures, which limits the possibilities of application, since said nozzles cannot be used in production machines that require a minimum volume of the applicator in the nozzle area of the adhesive outlet head on the surface on which the adhesive is to be deposited.

OBJECT OF THE INVENTION

According to the present invention, an adhesive applicator head is proposed, the embodiment of which offers features that improve its functionality, advantageously eliminating the drawbacks of conventional embodiments.

This applicator head object of the invention comprises a heated block, to which a feed of the adhesive to be applied and preferably a pressurised air supply is connected; linked to said heated block is an outlet nozzle for the laminar adhesive. In particular, the heated block and the outlet nozzle are connected by means of an injector module that controls the passage of the adhesive to the outlet nozzle, preferably by means of a solenoid valve, said adhesive outlet being able to be direct.

According to the invention, the outlet nozzle comprises, in this case, a body and a cover between which there is a space leading to an adhesive outlet groove; with regard to said space, and externally, there being a plate covering the groove, the plate being displaceable between different attachment positions of the plate to the nozzle determining variable lengths of laminar adhesive outlet through the groove.

In this way, it is possible to set an adhesive outlet width by setting the length of the groove delimited by end portions of the nozzle cover and by the plate that adjusts said width by closing the passage. Thus, it is not necessary to disassemble the nozzle to modify the width, but rather the length of the adhesive outlet groove is adjusted by simply displacing and attaching the plate. Production times are reduced, protecting the elements from possible deterioration due to disassembly, and the safety of the operators who will only carry out disassembly for maintenance work is protected.

The displacement of the plate between different positions is facilitated by the guidance provided by the very fit of the support of the plate on the nozzle body.

For greater sealing, it is envisaged that the plate covering the nozzle groove comprises a sealing gasket, so that said sealing is improved, avoiding adhesive leaks.

Preferably, the adhesive applicator head incorporates a sheet on the plate which fits into the space between the body and the cover of the nozzle, in such a way that it guides the plate in its displacement. Thus, more effective and safer guidance of the plate is provided.

Additionally, said sheet is preferably arranged at one end of the plate such that it limits the adhesive outlet width through the groove. Thus, when necessary, it is possible to limit the size of the adhesive outlet groove to a size smaller than the product to which the adhesive is applied.

It is envisaged that, preferably, the sheet can be moved and attached to the plate by means of joining means such as screws. In this way, the passage of adhesive through the groove is limited by setting the lamination width to the sheet, without the need to therefore replace the entire length adjustment plate of the adhesive outlet groove in the event of deterioration.

With this configuration, in the case it is used for labelling, the width can be set by the positioning of the labels on the nozzle body, supporting the same on the nozzle and abutting against the plate. This makes it possible to set the groove length to exactly coincide with the width of the labels, avoiding waste or poor adhesive application.

Additionally, the displaceable plate for adjusting the groove length is preferably attached to the nozzle body by means of screws that can be handled externally, so that by releasing said screws the movable plate can be displaced between different attachment positions that correspond to different widths of the lamination outlet of the adhesive to be applied. Therefore, to change said width of the lamination outlet, the nozzle does not have to be opened, thus allowing faster work processes.

External attachment allows the plate to be displaced between different attachment positions that determine variable widths of laminar adhesive outlet through the groove without disassembly being necessary, and adapting to any width necessary for the application of adhesive, which in the case of labelling provides the head with performance versatility for different types of labels without disassembly of the cover being required.

Additionally, as the groove is covered by means of the plate on the outside of the nozzle, said plate remaining on one side of the adhesive outlet area of the groove, it allows the nozzle to be smaller, allowing it to be mounted on assembly machines where the available space is very limited, this feature being a very important competitive advantage.

According to a feature of the invention, the plate comprises at least one longitudinal attachment groove, and preferably a plurality of grooves, particularly in the shape of elongated holes, for attachment thereof with the screws to the nozzle body, so that it can be attached in selected width positions of the groove. In this way, it is possible to adjust the desired width by simply loosening the screws and displacing the plate without having to completely release the screws. Thus, the adjustment is carried out more quickly and easily, reducing production times. This attachment groove also enables additional guidance of the plate by guiding with the screws along said attachment groove.

In addition, to attach the screws, it is envisaged that the nozzle body comprises a plurality of threaded holes distributed linearly to set the groove width, providing a more secure and precise attachment.

According to a feature of the invention, the applicator head comprises drive means for displacing the plate in the form of, for example, a spindle, a rack and pinion mechanism, an engine, etc. In this way, it enables the groove width to be automatically adjusted, which provides greater precision and reliability.

Preferably, it is envisaged that the movable plate incorporates a knob at the end of the plate corresponding to the area of maximum width of the groove. Said knob makes it easier for the manual drive to move the plate during the changes in positioning between the varying width positions of the adhesive lamination outlet, and for the rotational drive in the case of an endless screw mechanism. Therefore, the displacement of the plate is achieved without risks for the operator.

Another feature of the invention is that the space between the body and the cover of the nozzle preferably has, at one end of the groove corresponding to a maximum outlet length of the adhesive through the groove, an area with a greater width of separation between the nozzle body and the cover than in the rest of the length of said space. Thus, through said area of greater width, the sheet can be inserted after completely extracting the plate if maintenance, cleaning or replacement were necessary, without the need to release the nozzle cover.

With all this, an adhesive applicator head is obtained that is simple to implement, so that it can easily and quickly adapt to different widths of adhesive lamination to be applied, as well as clean the movable outlet adjusting plate when necessary, while the structural formation enables the movable plate to be brought closer until it makes contact with the surface on which to the adhesive is to be applied, in applications such as bottle labelling, making it possible to determine the exact width required for the application in each case.

Therefore, this adhesive applicator head object of the invention has advantageous constructive and functional features, acquiring its own life and preferential nature with respect to conventional applicator heads with the same function.

DETAILED DESCRIPTION OF THE INVENTION

The object of the invention relates to an adhesive applicator head, for use in processes such as, for example, bottle labelling, without this use being limiting, the head comprising a heated block (1), to which a feed (2) of the adhesive to be applied is connected and, for the illustrative example, it further comprises a pressurised air supply duct (3) to lead the adhesive to the outside according to the desired pressure. Linked to said heated block (1) is a nozzle (4), which determines an outlet for the laminar projection of the adhesive to be applied.

Figure 1:
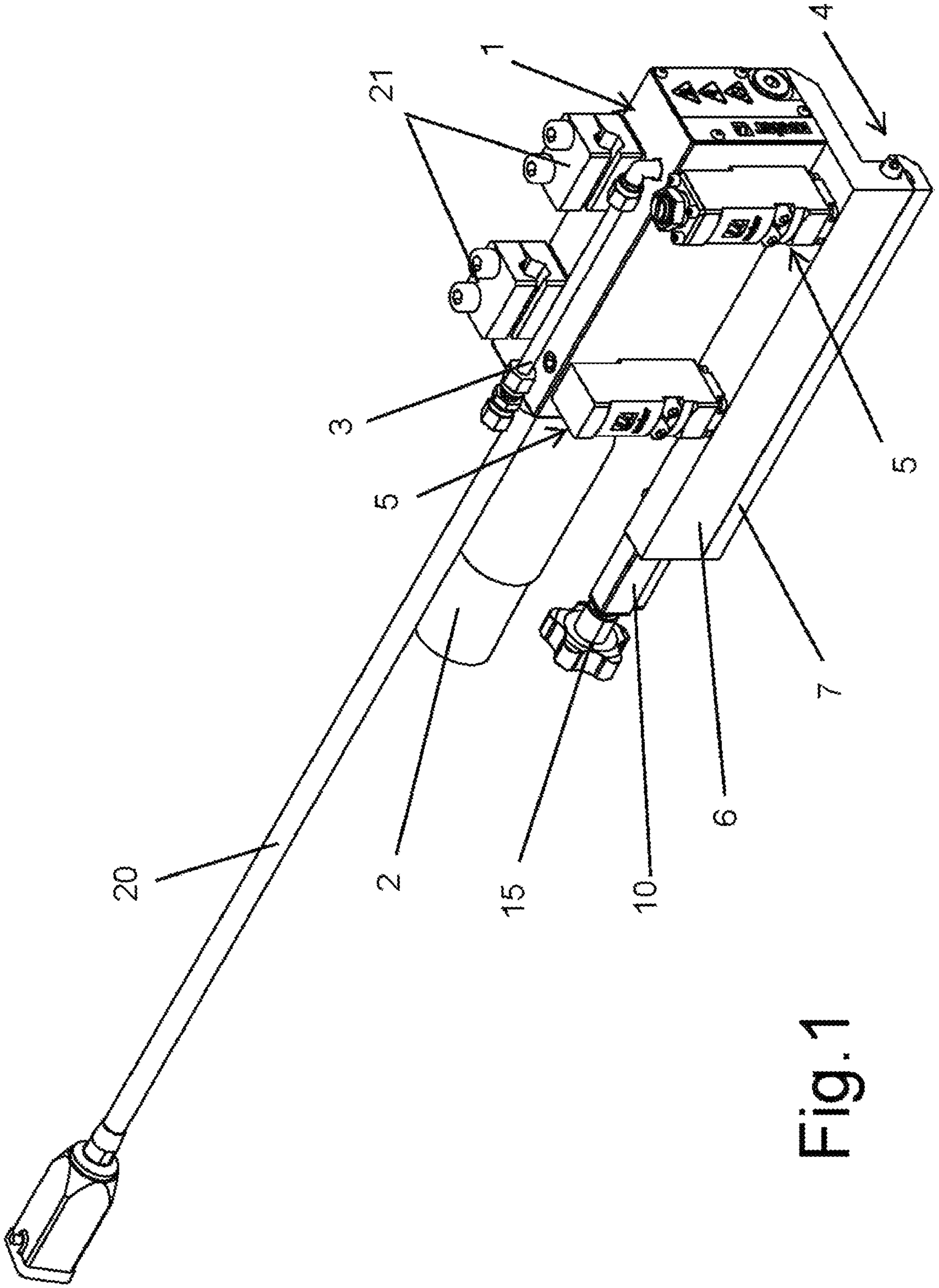
FIG. 1 shows a perspective view of an exemplary embodiment of the adhesive applicator head object of the invention from the rear view.
Figure 2:
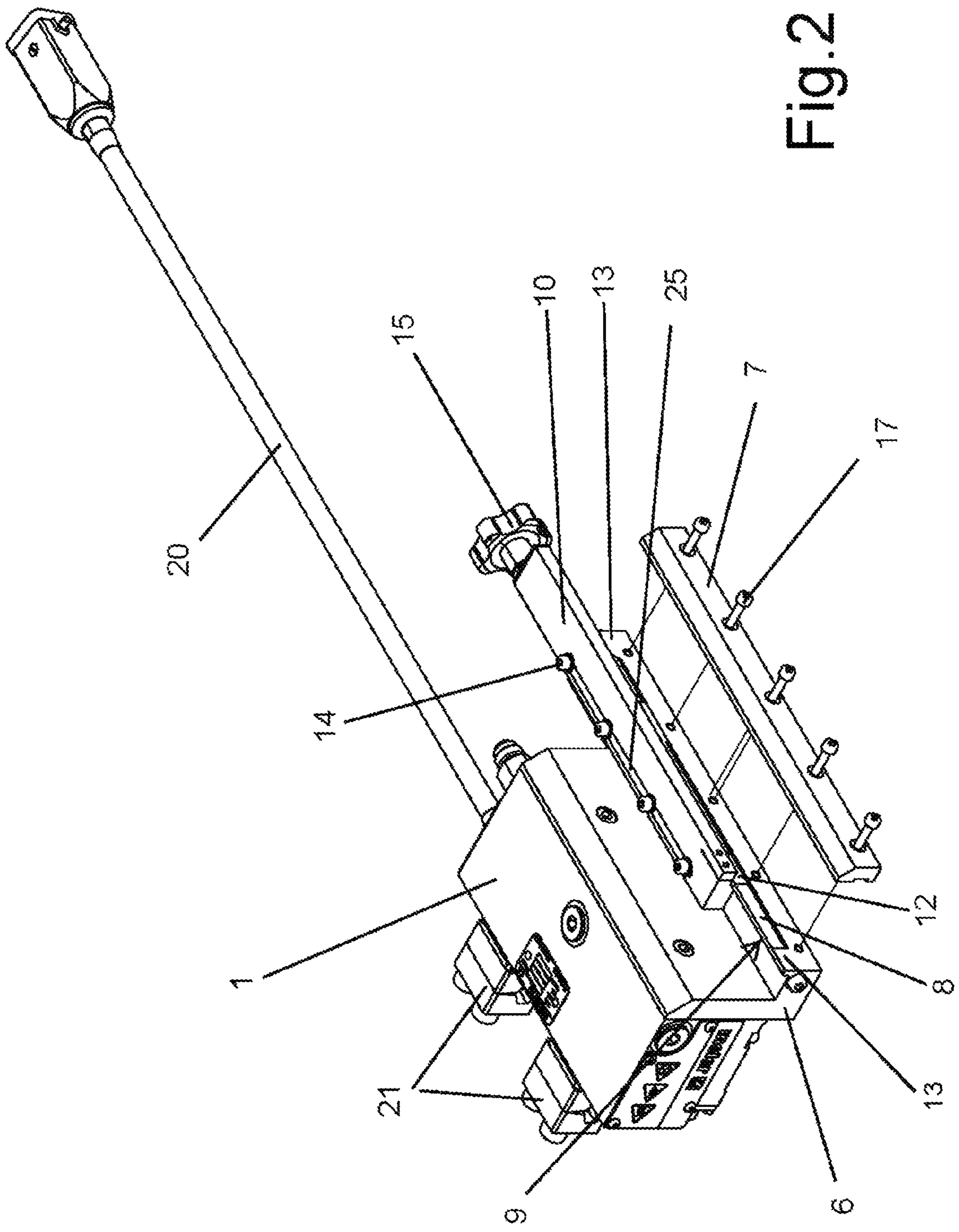
FIG. 2 is a perspective view of the head from the front view with the cover of the nozzle exploded to show the space between the nozzle body and the cover.

As shown in FIG. 2, the nozzle (4) comprises a body (6) and a cover (7), the cover (7) being able to be attached by means of screws (17), leaving a space (8) between them, which leads to a groove (9) which is what determines the outlet of the adhesive for its application in laminar form. On the outside of said nozzle (4) and arranged with regard to the space (8), a plate (10) is incorporated which comprises a sheet (12) that can be fit into the space (8) so that an adhesive outlet length is set between said sheet (12) and a limiting portion (13) of the nozzle body (6). The sheet (12) being able to be removed and attached to the plate (10) by means of screws, and also acting as a retainer fora sealing gasket (11) comprised in the plate (10) which provides greater sealing to the closure of the passage of adhesive to the outside.

The plate (10) is secured to the body (6) of the nozzle (4) by means of screws (14), which can be handled externally, so that by loosening said screws (14) the plate (10) can move between different positions that determine variable widths of laminar adhesive outlet through the groove (9). The movement of the plate is guided by a groove (25), which may be a plurality of grooves in the shape of elongated holes, through which the plate is attached with the screws (14), by the very fit of the support of the plate (10) on the body (6) of the nozzle (4) or by the guidance of the sheet (12) in the groove (9). Threaded holes exist in different longitudinal situations, for screwing the aforementioned screws (14) in the different width varying positions of the laminar adhesive outlet through the groove (9) for the application, so that secure attachment of the plate (10) can be established by means of the screws (14) in all the positions.

At the rear end, the plate (10) incorporates a knob (15), with which the handling of said plate (10) is facilitated for the displacement thereof between the different adjustment positions of the width of laminar adhesive outlet for the application. This embodiment is preferred for the purposes of reduced economic formation of the applicator head, but it does not rule out other solutions such as drive means for displacing the plate (10) in the form of, for example, a spindle, a rack and pinion mechanism, an engine, etc., which enables the plate (10) to be displaced with greater pressure and/or less effort.

Figure 6:
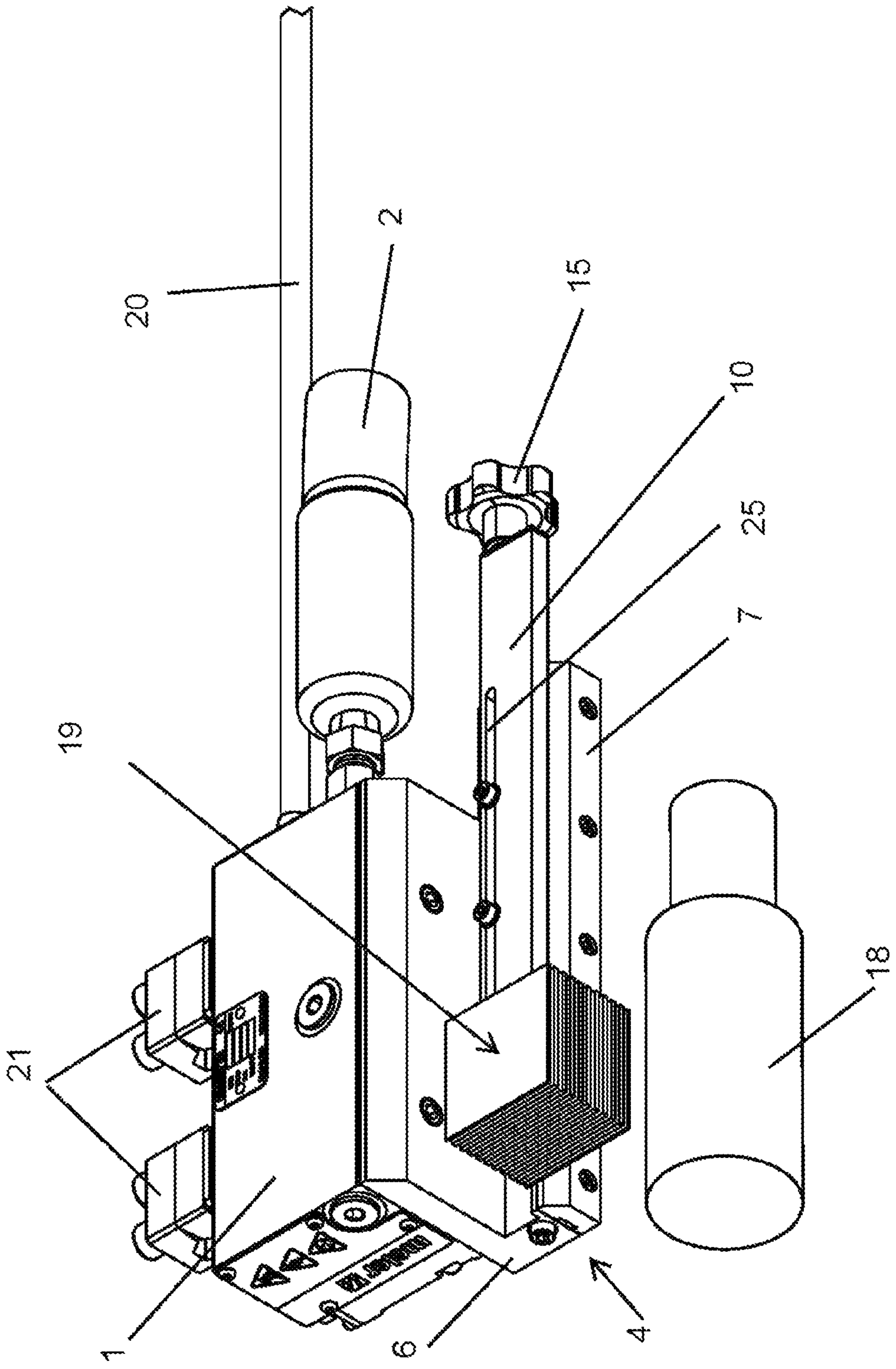
FIG. 6 is a perspective view of the adhesive applicator head for a bottle labelling function, in which the stack of labels and the bottle can be seen as they are brought closer.

Thus, for the operation of the adhesive applicator head, said head will be attached by means of a mounting flange (21) and connected to the power supply by means of a connection tube (20). As shown in FIG. 6, the stack of labels (19) is placed on the nozzle (4) so that once the adhesive is applied, the label is deposited on the bottle (18).

Figure 4:
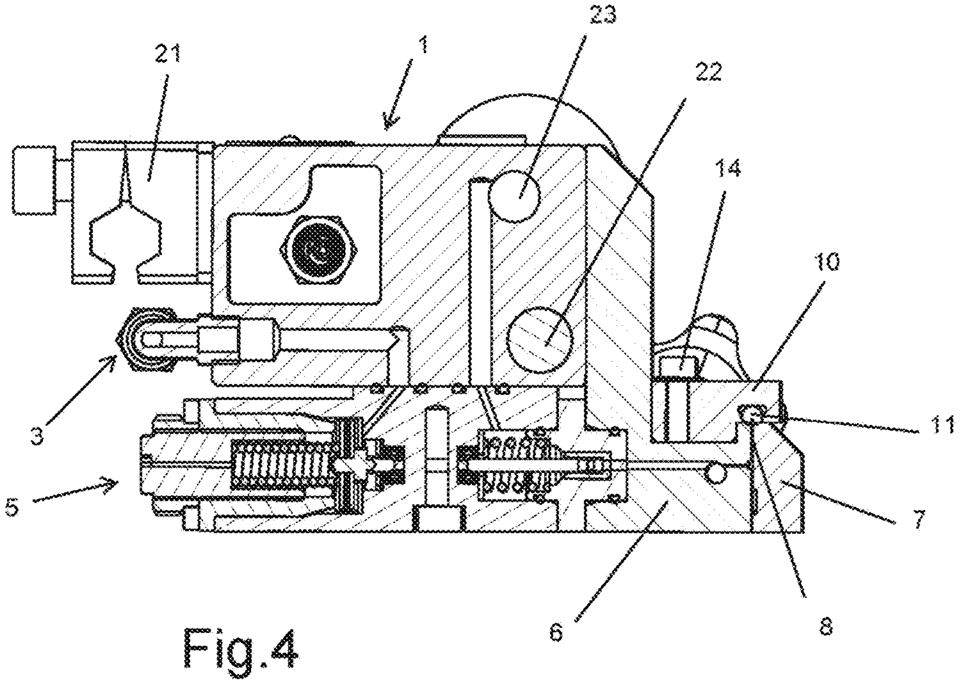
FIG. 4 is a cross-sectional view of the adhesive outlet nozzle of the applicator head according to the invention.
Figure 5:
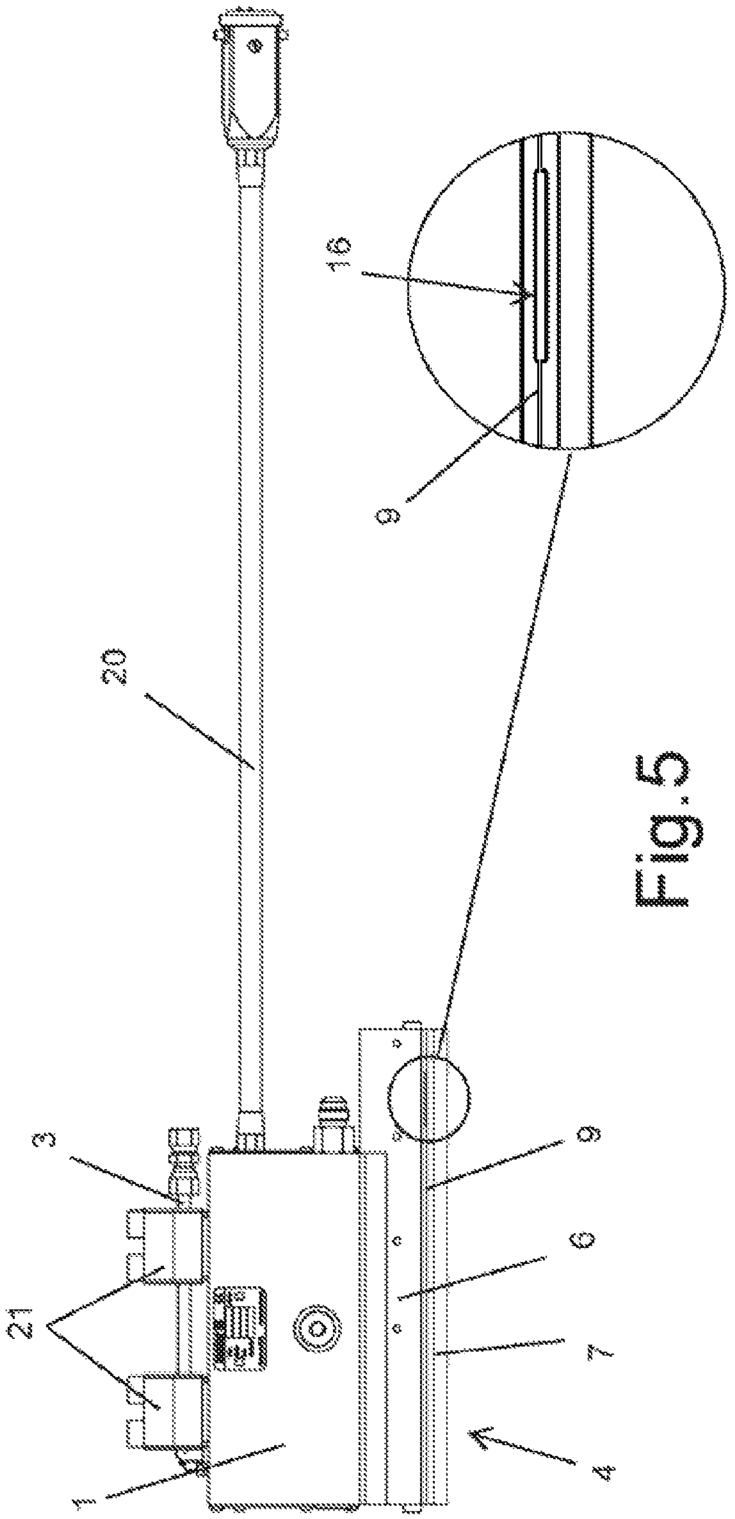
FIG. 5 is a top view of the head without the plate, which shows the groove and the area of greater width in detail for better clarity.

The adhesive is supplied from the feed (2) to the heated block (1) circulating through an adhesive distribution duct (23). As shown in FIG. 4, the adhesive is diverted by a duct towards the adhesive outlet through the body (6) of the nozzle (4). This channeling can be direct or preferably controlled by injector modules (5), enabling the passage of adhesive to be controlled and intermittent applications to be carried out. In the event of having injector modules (5) like the preferred example, the opening thereof is controlled by means of the action of a pressurised air duct (3) to which pressure is applied in order to open the injector module (5) that will enable optimal outlet of the adhesive.

In the event that a faster outlet is desired, the injector module (5) coinciding with the end with the smallest width of the groove (9) will be acted upon. The injector module (5) closest to the end with the largest width of the groove (9) will be used when there is a desire to pull all the adhesive through the space (8) until it exits through the groove (9) according to the set width, so that there is no adhesive residue in the space (8) that could dry out and block the adhesive outlet.

Once the plate (10) is attached according to the required width of the label or produced product, said width can be easily adjusted when the labels (19) abut in their support against the plate (10).

To set the width of the groove (9), the sheet (12) is arranged on the plate (10) which enables the applied width to be reduced a size smaller than that of the label. This reduction in width depends on the size of the free wing of the sheet (12) outside the plate (10) in the area of the groove (9). If the products require different reductions, said sheet (12) can be changed by releasing the attachment elements of the same to the plate (10), which are preferably screwed elements.

Figure 3:
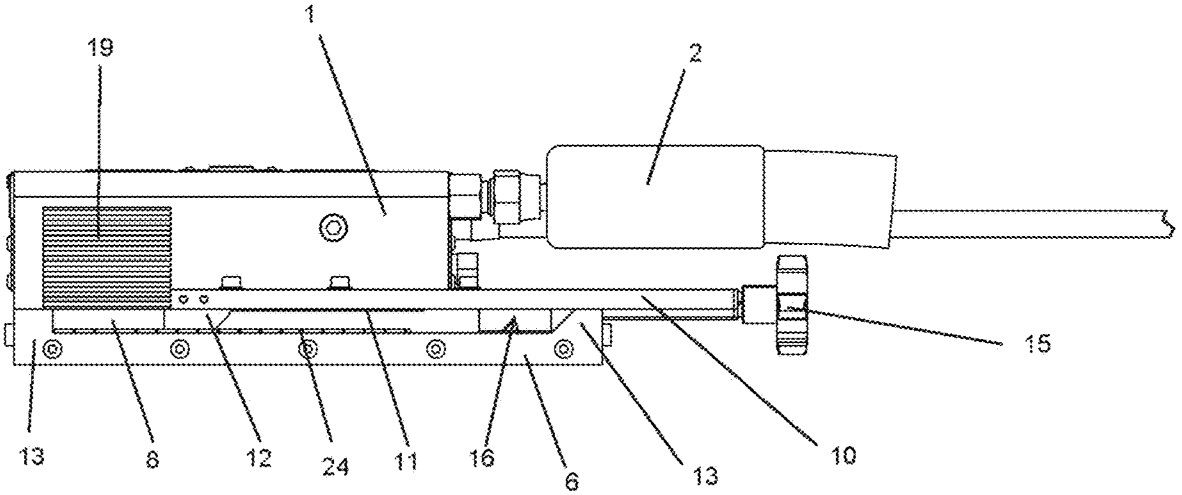
FIG. 3 is a front view of the adhesive applicator head, without the cover of the adhesive outlet nozzle, which shows the space between the nozzle body and the cover through which the adhesive is distributed via communication holes with the heated block, for the adhesive outlet through the groove.

Thus, when necessary, the adhesive will be injected into the nozzle (6), from the heated body (1) through outlet holes (24) and will be distributed for its outlet through the space (8) as shown in FIG. 3, to lead to the groove (9).

For the preferred embodiment of a head application in a labelling machine, at this moment the bottle (18), which already has a previous application of adhesive, comes in contact with one to end of the label (19), affixing the same to the bottle (18), and with the rotating displacement of the bottle (18) and with the adhesive already applied by the head on the other end of the label, the complete affixing of the label on the bottle (18) will take place.

Preferably, the electrical resistor (22) of the heated block (1) is located close to the drive of the adhesive, as shown in FIG. 4. Therefore, both in its circulation through the adhesive distribution conduct (23) and in its distribution to the nozzle (4), the adhesive is kept in optimal temperature conditions. Preferably, the heated block (1) has a temperature control probe to enable perfect adjustment.

Furthermore, the plate (10) with the sheet (12) is removed for cleaning and maintenance tasks in such a way that the screws (14) are released very simply and quickly. Subsequent repositioning is more delicate due to the fine adjustment of thickness between the groove (9) and the sheet (12) that prevents adhesive leaks during operation. To facilitate this process and avoid having to act on the cover (7) of its fastening on the body (6) of the nozzle (4), an area (16) of greater width than the rest of said space (8) is envisaged at the rear end of the space (8) to facilitate the reinsertion of the sheet (12).

Another advantage of the design object of the invention is that the very plate (10), together with the width limiting sheet (12), can be used as a cleaning element for the entire width of the groove (9) without having to act and disassemble the nozzle cover (7). Complete disassembly will only be required if more complex maintenance is to be carried out.

As mentioned above, the fastening of the cover (7) of the nozzle (4) is established by securing with screws (17), so that by releasing said screws (17) the cover (7) can also be removed to clean the space (8) and the adhesive outlet and distribution area with the outlet holes (24) if necessary.

In this way, the adhesive applicator head results in a simple structural embodiment, with an advantageous functionality for adjusting the laminar outlet width of the adhesive to be applied and for cleaning the adjustment elements of said outlet, leaving the adhesive application outlet in an arrangement that, in bottle (18) labelling applications, enables the bottles (18) to be labelled to be positioned in contact with the plate (10), facilitating adjustment to adjust the laminar adhesive outlet width according to the labels to be affixed.

The invention claimed is:

1. An adhesive applicator head, comprising a heated block to which an adhesive feed is connected; linked to said heated block is a nozzle determining an outlet for a laminar projection of the adhesive feed to be applied from the heated block, wherein the nozzle comprises a body and a cover between which there is a space leading to an adhesive outlet groove; with regard to said space, and externally, there being a plate covering the groove, the plate being displaceable between different attachment positions of the plate to the nozzle determining variable lengths of laminar adhesive outlet through the groove.

2. The adhesive applicator head, according to claim 1, wherein the plate covers the groove by means of a sealing gasket.

3. The adhesive applicator head, according to claim 1, wherein the plate incorporates a sheet that enters the space in such a way that said sheet guides a displacement of the plate.

4. The adhesive applicator head, according to claim 1, wherein the sheet is arranged at one end of the plate such that the sheet limits the adhesive outlet width through the groove.

5. The adhesive applicator head, according to claim 1, wherein the plate is attached to the body of the nozzle by means of screws, which can be handled externally to free a displacement of said plate between different attachment positions.

6. The adhesive applicator head, according to claim 5, wherein the plate comprises a groove for attachment thereof with the screws so that the plate can be attached in selected width positions of the groove.

7. The adhesive applicator head, according to claim 1, further comprising drive means for displacing the plate.

8. The adhesive applicator head, according to claim 4, wherein the plate incorporates a knob for handling a displacement of the plate.

9. The adhesive applicator head, according to claim 1, wherein the space has, at one end of the groove corresponding to a maximum outlet length of an adhesive through the groove, an area with a greater width of separation between the body and the cover than a remaining length of said space.

* * * * *